(12) United States Patent
Lee et al.

(10) Patent No.: US 9,599,856 B2
(45) Date of Patent: Mar. 21, 2017

(54) DISPLAY DEVICE

(71) Applicant: Samsung Display Co., Ltd., Yongin, Gyeonggi-Do (KR)

(72) Inventors: Kwang Keun Lee, Osan-si (KR); Young Min Kim, Yongin-si (KR); Min Ki Nam, Anseong-si (KR); Hae Il Park, Seoul (KR); Seon Tae Yoon, Seoul (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 65 days.

(21) Appl. No.: 14/608,490

(22) Filed: Jan. 29, 2015

(65) Prior Publication Data
US 2016/0033823 A1    Feb. 4, 2016

(30) Foreign Application Priority Data

Jul. 30, 2014 (KR) .................. 10-2014-0097379

(51) Int. Cl.
*G02F 1/1337* (2006.01)
*G02F 1/1335* (2006.01)

(52) U.S. Cl.
CPC .. *G02F 1/133617* (2013.01); *G02F 1/133514* (2013.01); *G02F 2001/133521* (2013.01)

(58) Field of Classification Search
CPC ......... G02F 1/133514; G02F 1/133516; G02F 2001/133521
See application file for complete search history.

(56) References Cited

U.S. PATENT DOCUMENTS

| | | |
|---|---|---|
| 2007/0222354 A1 | 9/2007 | Chen |
| 2008/0055515 A1 | 3/2008 | Ha et al. |
| 2010/0265692 A1 | 10/2010 | Willemsen et al. |

FOREIGN PATENT DOCUMENTS

| | | |
|---|---|---|
| KR | 10-2007-0096728 A | 10/2007 |
| KR | 10-2011-002228 A | 3/2011 |
| KR | 10-2013-0000506 A | 1/2013 |

*Primary Examiner* — Phu Vu
(74) *Attorney, Agent, or Firm* — Robert E. Bushnell, Esq.

(57) ABSTRACT

A display device having a first substrate, a second substrate above and facing the first substrate, a light-amount adjusting layer interposed between the first substrate and the second substrate, a plurality of color conversion layers respectively defining a plurality of pixel regions, a wavelength conversion layer disposed on a bottom surface of the color conversion layers, and a backlight unit disposed under the first substrate. The light-amount adjusting layer comprises liquid crystal molecules.

21 Claims, 10 Drawing Sheets

DISPLAY DEVICE

CLAIM OF PRIORITY

This application makes reference to, incorporates the same herein, and claims all benefits accruing under 35 U.S.C. §119 from an application earlier filed in the Korean Intellectual Property Office on the 30 of Jul. 2014 and there duly assigned Serial No. 10-2014-0097379.

BACKGROUND OF THE INVENTION

Field of the Invention

Aspects of embodiments of the present invention relate to a display device including a wavelength conversion layer configured to prevent color mixing between adjacent pixels.

Description of the Related Art

A liquid crystal display (LCD) is a type of flat panel displays (FPDs), which is the most widely used these days. The LCD includes two substrates including electrodes formed thereon and a liquid crystal layer interposed therebetween. Upon applying voltage to the electrodes, liquid crystal molecules of the liquid crystal layer are rearranged, thereby adjusting the amount of transmitted light.

The LCD device may express colors using a color conversion layer including a phosphor instead of a color filter. In a case where the color conversion layer including the phosphor is used, a viewing angle can be improved and excellent color reproduction can be achieved, but display quality may deteriorate.

Therefore, the LCD device using the color conversion layer including a phosphor requires a structure for preventing color mixing between adjacent pixels.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

The present disclosure of invention is directed to a display device including a wavelength conversion layer under a color conversion layer.

According to an embodiment of the present invention, a display device may include: a first substrate; a second substrate above and facing the first substrate; a light-amount adjusting layer interposed between the first substrate and the second substrate; a plurality of color conversion layers respectively defining a plurality of pixel regions; and a wavelength conversion layer disposed on a bottom surface of the color conversion layers; and a backlight unit disposed under the first substrate.

The color conversion layers and the wavelength conversion layer may be disposed on a bottom surface of the second substrate, and the light-amount adjusting layer may comprise liquid crystal molecules.

The color conversion layer and the wavelength conversion layer may be disposed on a top surface of the second substrate, and the light-amount adjusting layer may comprise liquid crystal molecules.

The display device may further include a third substrate above and facing the second substrate.

The wavelength conversion layer and the color conversion layer may be disposed between the second substrate and the third substrate.

The wavelength conversion layer may convert light emitted from the backlight unit into infrared rays.

The wavelength conversion layer may have a thickness in a range of 1 µm to 10 µm.

The wavelength conversion layer may include a phosphor.

The phosphor may include a quantum dot particle.

The color conversion layer may include a partition wall defining pixel areas, and color phosphor disposed in the pixel areas defined by the partition wall.

The phosphor may include at least one of a red phosphor, a green phosphor, and a blue phosphor.

The display device may further include a blue transmissive layer under the wavelength conversion layer.

The display device may further include a blue blocking layer on the red phosphor and the green phosphor.

The color conversion layer may include a phosphor and a transparent layer.

According to an embodiment of the present invention, a display device may include: a first substrate; a second substrate above and facing the first substrate; a light-amount adjusting layer interposed between the first substrate and the second substrate; a backlight unit disposed under the first substrate; a wavelength conversion layer; and a plurality of color conversion layers corresponding to a plurality of pixel regions disposed between the wavelength conversion layer and the light-amount adjusting layer.

The color conversion layer and the wavelength conversion layer may be disposed on a bottom surface of the first substrate.

The wavelength conversion layer may be disposed on an upper surface of the first substrate.

The display device may further include a polarizer disposed under the color conversion layers, wherein the light-amount adjusting layer comprises liquid crystal molecules.

According to an embodiment of the present invention, a display device may include: a first substrate; a second substrate above and facing the first substrate; a light-amount adjusting layer interposed between the first substrate and the second substrate; a backlight unit disposed under the first substrate; a wavelength conversion layer; and a plurality of color conversion layers corresponding to a plurality of pixel regions disposed on the wavelength conversion layer.

The wavelength conversion layer may be disposed on an upper surface of the second substrate; and a polarizer may be disposed on the color conversion layers, wherein the light-amount adjusting layer may comprise liquid crystal molecules.

According to embodiments of the present invention, a display device can achieve an excellent color reproduction by preventing color mixing and can be utilized as a well-being display device that has, for example, a sking therapy function by radiating infrared rays converted through a wavelength conversion layer.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to a first embodiment of the present invention will be described with reference to FIGS. 1 to 3.

Figure 1:
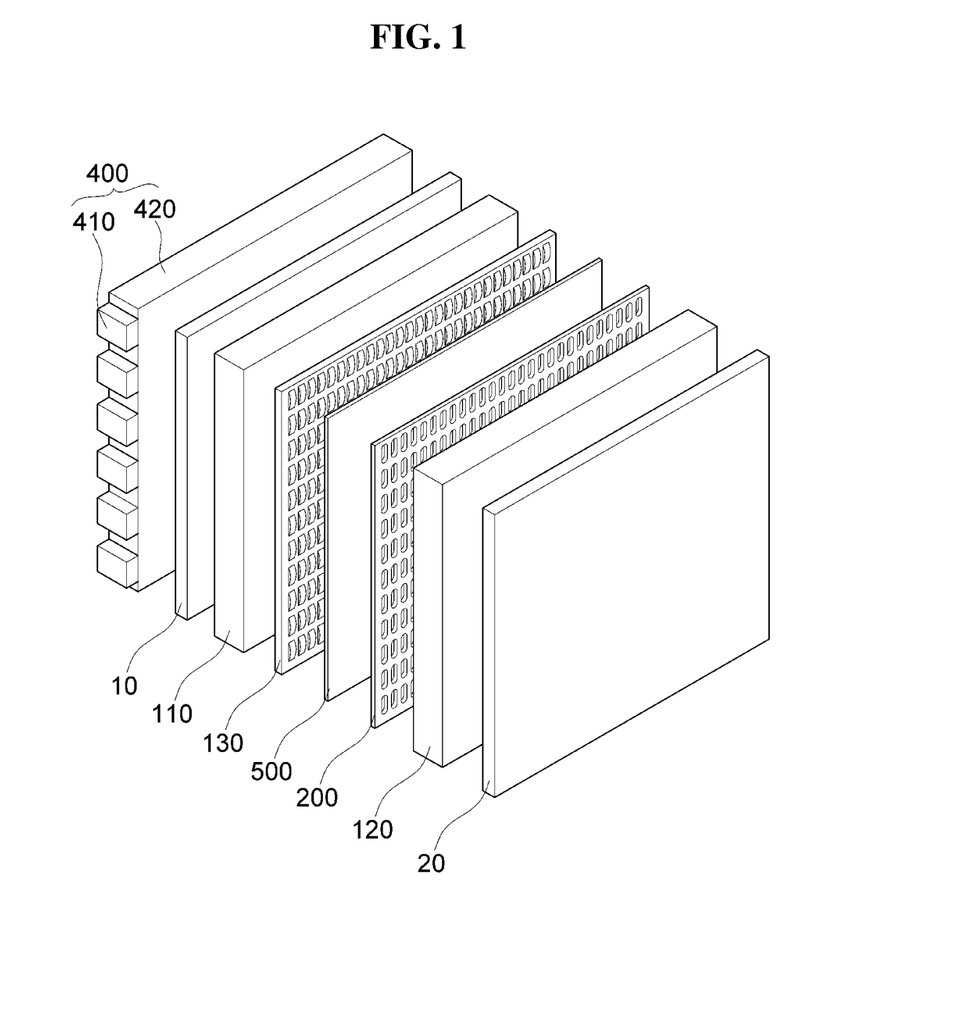
FIG. 1 is an exploded perspective view illustrating a display device according to a first embodiment of the present invention.

FIG. 1 is an exploded perspective view illustrating a display device according to a first embodiment of the present invention. FIG. 2 is a schematic cross-sectional view illustrating the display device of FIG. 1. FIG. 3 is a cross-sectional view illustrating a pixel of the display device of FIG. 2.

Figure 2:
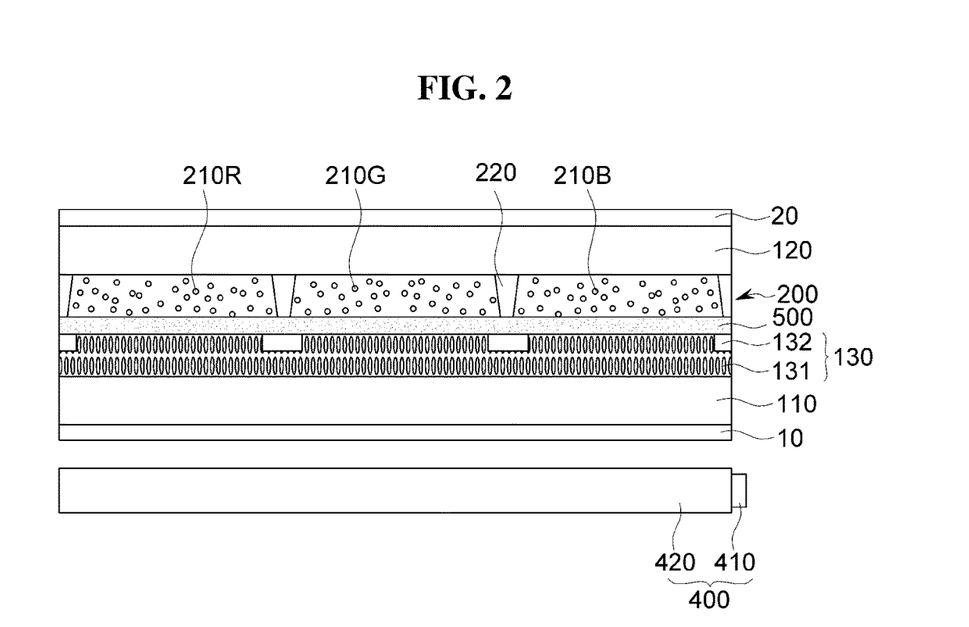
FIG. 2 is a schematic cross-sectional view illustrating the display device of FIG. 1.
Figure 3:
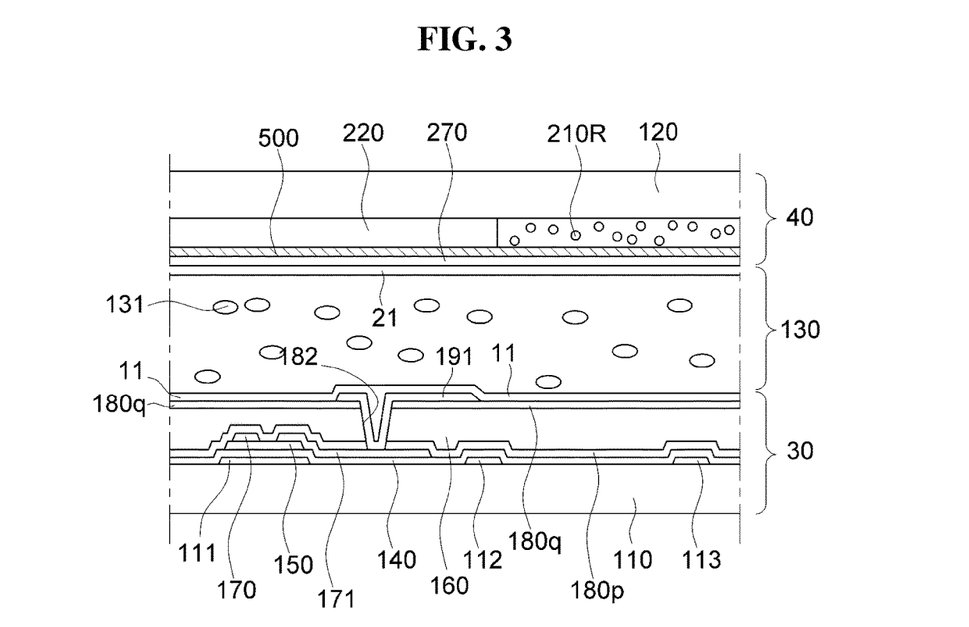
FIG. 3 is a cross-sectional view illustrating a pixel of the display device of FIG. 2.

Referring to FIGS. 1 to 3, a display device includes a substrate 110, a light-amount adjusting layer (i.e., a liquid crystal layer) 130 disposed on the substrate 110, a substrate 120 disposed on the light-amount adjusting layer 130 and disposed to face the substrate 110, a backlight unit 400 disposed under the substrate 110, a polarizer 10 disposed under the substrate 110 and a polarizer 20 disposed on the substrate 120.

The substrate 120 includes a plurality of color conversion layers 200 respectively disposed on a plurality of pixel regions and a wavelength conversion layer 500 disposed between the color conversion layers 200 and the light-amount adjusting layer 130.

The substrate 110 and the substrate 120 may be made of transparent materials such as glass and plastics.

The light-amount adjusting layer 130, the wavelength conversion layer 500, and the plurality of color conversion layers 200 are disposed between the substrate 110 and the substrate 120. The wavelength conversion layer 500 is disposed on the light-amount adjusting layer 130 and the color conversion layers 200 are disposed on the wavelength conversion layer 500.

The display device includes a plurality of pixels corresponding to a perpendicular direction of the substrate 110, the substrate 120, the light-amount adjusting layer 130, the wavelength conversion layer 500, and the plurality of color conversion layers 200. The plurality of pixels may be disposed in a matrix form on a plane surface.

The backlight unit 400 is disposed under the substrate 110. The backlight unit 400 includes a light source 410 and a light guide plate 420. The backlight unit 400 may radiate ultraviolet rays, near-ultraviolet rays, or blue light.

The polarizer 10 and the polarizer 20 are respectively disposed on the substrate 110 and the substrate 120 in the opposite sides from facing surfaces of the substrate 110 and the substrate 120. That is, the polarizer 10 may be attached on an outer side of the polarizer 10 and the polarizer 20 may be attached on the outer side of the substrate 120. A transmissive axis of the polarizer 10 may be substantially at right angles to a transmissive axis of the polarizer 20.

The light-amount adjusting layer 130 may include a plurality of liquid crystal molecules 131. The light-amount adjusting layer 130 may further include a light blocking member 132 that defines boundaries of the plurality of pixels.

The plurality of color conversion layers 200 includes a partition wall 220 defining a plurality of pixel regions and a plurality of phosphors 210R, 210G, and 210B disposed in the plurality of pixel regions defined by the partition wall 220.

The plurality of color conversion layers 200 may include a first color pixel, a second color pixel, a third color pixel, and the like. For example, the first color pixel may be a red pixel, the second color pixel may be a green pixel, and the third pixel may be a blue pixel. The red color pixel includes the red phosphor 210R, the green pixel includes the green phosphor 210G, and the blue pixel includes the blue phosphor 210B.

Light leaving the red pixel of the color conversion layers 200 exhibits a red color, light leaving the green pixel exhibits a green color, and light leaving the blue pixel exhibits a blue color.

The color conversion layers 200 may be formed of resins including the phosphors 210R, 210G, and 210B. The phosphor is a substance emitting fluorescence when irradiated with light, radiation, and the like. Each of the phosphors emits light of a unique color regardless of a color of the radiated light. Further, the phosphor emits the light toward the whole area, regardless of a direction of the radiated light.

Although not illustrated, the color conversion layers 200 may include a phosphor having another color besides the above-described colors and the phosphor may scatter light having a fourth color.

The phosphors 210R, 210G, and 210B of the color conversion layers 200 may include quantum dot particles.

Color mixing may occur in conventional display devices because of the plurality of color conversion layers 200. For example, in a case where light is incident on a red pixel of the color conversion layers 200 to display a red color, part of light may be incident on a blue pixel or a green pixel disposed adjacent to the red pixel. That is, the part of light incident on the blue pixel or the green pixel may display a blue color or a green color, thereby displaying a red color having a lower color temperature because of the partly mixed blue and green colors. Light incident on the adjacent pixels is 10% or less of the whole light.

Therefore, the wavelength conversion layer 500 is disposed under the color conversion layers 200 in order to prevent color mixing in the display device and includes the phosphor. That is, the wavelength conversion layer 500 is disposed adjacent to the backlight unit 400 compared to the color conversion layers 200. Accordingly, the light emitted from the backlight unit 400 is incident on the color conversion layers 200 via the wavelength conversion layer 500.

The wavelength conversion layer 500 converts light emitted from the backlight unit 400 into infrared rays using the phosphor. The wavelength conversion layer 500 converts 1 to 10% of light out of an amount of the whole light incident on the color conversion layers 200 into infrared rays. That is, the wavelength conversion layer 500 prevents the color mixing by converting light incident on the adjacent pixels that causes the color mixing into infrared rays that is invisible to the human eye.

For example, when expressing a red color, only a part of light incident to the red pixel of the color conversion layers 200 is converted into infrared rays and most of light is incident on the red pixels of the color conversion layers 200. Light incident on the green or blue pixels disposed adjacent to the red pixel is less than 10% of the whole light, and thus the wavelength conversion layer 500 may convert the whole light incident on the adjacent pixels into infrared rays.

Further, when displaying a red color, the light incident on the red pixel has an incident angle of 0 degree, but light incident on the adjacent pixels has an incident angle of about 18 to 40 degree. In accordance with a difference in incident angles, when light is incident on the adjacent pixels, a lightpath length of light passing through the wavelength conversion layer 500 becomes longer compared to light incident on the red pixel. That is, a lightpath length of light obliquely incident, instead of being perpendicularly incident, on the wavelength conversion layer 500 is increased. Accordingly, an amount of light converted into the infrared light is increased in the adjacent pixels.

In some embodiments, the phosphor included in the wavelength conversion layer 500 may include quantum dot particles. The wavelength conversion layer 500 has a thickness of about 1 μm to 10 μm. The wavelength conversion layer 500 may adjust a proportion of light converted into infrared light by adjusting the content of the quantum dot particles and the lightpath length.

The quantum dot particles are wavelength converting particles that may adjust the wavelength of light so as to emit specific desired light. Different-sized quantum dot particles may convert different wavelengths. Therefore, light of a desired color may be emitted by adjusting a diameter of the quantum dot.

The quantum dot particle may have a 100 to 1000 times larger extinction coefficient and a high quantum yield compared to general fluorescent dyes, thereby producing very strong fluorescence.

Particularly, the quantum dot particles may shift and convert provided light having a short wavelength into light having a longer wavelength.

The quantum dot particles may include core nanocrystals and shell nanocrystals surrounding the core nanocrystals. Further, the quantum dot particles may include organic ligands bonded to the shell nanocrystals. Further, the quantum dot particles may further include an organic coating layer surrounding the shell nanocrystals.

The shell nanocrystals may have two or more layers. The shell nanocrystals are formed on a surface of the core nanocrystals. The quantum dot particles may convert a wavelength of light incident to the core nanocrystals into a longer wavelength and improve light efficiency by using the shell nanocrystals forming a shell layer.

The quantum dot particles may include at least one substance of group II compound semiconductors, group III compound semiconductors, group V compound semiconductors, and group VI compound semiconductors. In more detail, the core nanocrystals may include PbSe, InAs, PbS, CdSe, InGaP, CdTe, CdS, ZnSe, ZnTe, ZnS, HgTe or HgS. Further, the shell nanocrystals may include CuZnS, CdSe, CdTe, CdS, ZnSe, ZnTe, ZnS, HgTe or HgS.

For example, in a case where a core nanocrystal includes CdSe and a diameter of a quantum dot particle is 1 nm to 3 nm, blue light may be emitted. Further, in a case where the diameter of the quantum dot particle is 3 nm to 5 nm, green light may be emitted, and in a case where the diameter of the quantum dot particle is 7 nm to 10 nm, red light may be emitted.

The wavelength of the light emitted from the quantum dot particles may be adjusted depending on a size of the quantum dot particle or a molar ratio of a molecular cluster compound and a nano-sized precursor in a compounding process. An organic ligand may include pyridine, mercapto alcohol, thiol, phopshinc, and phosphine oxide, and thus. The organic ligand plays a role in stabilizing the quantum dot particle that becomes unstabilized after synthesized. That is, after the quantum dot particle is synthesized, a dangling bond is formed outside, which may make the quantum dot particle unstabilized. However, one end of the organic ligand is nonbonding and the one end of the nonbonding organic ligand may be bonded to the dangling bond, thereby stabilizing the quantum dot particle.

The quantum dot particle may be synthesized by a wet-chemical method. Herein, the wet-chemical method refers to a method where a precursor material is put into an organic solvent to develop a particle. By this wet-chemical method, the quantum dot particle can be synthesized.

Thus, the wavelength conversion layer 500 may convert light into infrared rays by adjusting the diameter of the quantum dot particle. The quantum dot particles included in the wavelength conversion layer 500 respectively have diameter ranges according to compound semiconductors included therein, so that the quantum dot particles may emit infrared rays. For example, in a case where the quantum dot particle includes PbSe (Lead Selenide), the quantum dot particle can convert light into infrared rays on condition that the diameter of the quantum dot particle is larger than 3 nm. In a case where the quantum dot particle includes InAs (Indium Arsenide), the quantum dot particle can convert light into infrared rays on condition that the diameter of the quantum dot particle is larger than 30 nm. Further, in a case where the quantum dot particle includes PbS (Lead Sulphide), the quantum dot particle can convert light into infrared rays on condition that the diameter of the quantum dot particle is larger than 18 nm. Therefore, the quantum dot particles may be manufactured by adjusting diameters in consideration of the compound semiconductors included therein.

Hereinafter, a pixel of the display device will be described in detail with reference to FIG. 3.

The display device includes a lower display panel 30 and an upper display panel 40 disposed to face each other and the light-amount adjusting layer 130 disposed between the two display panels 30 and 40. FIG. 3 illustrates that a liquid crystal layer is used as the light-amount adjusting layer 130 according to an embodiment of the present invention.

Firstly, the lower display panel 30 will be described.

A gate line and a storage electrode line 112 are disposed on the substrate 110 in one direction. The substrate 110 may be made of a transparent material, such as glasses and plastics.

The gate line generally extends in a width direction and supplies a gate signal. A gate electrode 111 protrudes from the gate line.

The storage electrode line 112 extends in the same direction as the gate line and a predetermined voltage is applied to the storage electrode line 112. The storage electrode 113 protrudes from the storage electrode line 112.

A gate insulating layer 140 is formed on the gate line, the storage electrode line 112, the gate electrode 111, and the storage electrode 113. The gate insulating layer 140 may be made of inorganic insulating materials, such as silicon nitride (SiNx) and silicon oxide (SiOx). Further, the gate insulating layer 140 may have a single-layer or a multi-layer structure.

A semiconductor layer 150 is formed on the gate insulating layer 140. The semiconductor layer 150 may be disposed on the gate electrode 111.

The semiconductor layer 150 may be made of amorphous silicon, polycrystalline silicon, metal oxide, and the like.

An ohmic contact member (not illustrated) may be further formed on the semiconductor layer 150.

A data line, a source electrode 170, and a drain electrode 171 are formed on the semiconductor layer 150 and the gate insulating layer 140.

The semiconductor layer 150 may be formed not only on the gate electrode 111 but also under the data line.

The data line generally extends in a length direction and intersects with the gate line. The data line supplies a data voltage.

The source electrode 170 is formed protruding from the data line toward the gate electrode 111. The source electrode 170 may be bent on the gate electrode 111 having a C-form.

The drain electrode 171 is spaced apart from the source electrode 170 on the gate electrode 111. A channel is formed on the semiconductor layer 150 in an exposed area between the source electrode 170 and the drain electrode 171 spaced apart from each other.

The gate electrode 111, the semiconductor layer 150, the source electrode 170, and the drain electrode 171 form a switching element.

A protective film 180$p$ is formed on the data line, the source electrode 170, the drain electrode 171, and the semiconductor layer 150 exposed between the source electrode 170 and the drain electrode 171. The protective film 180$p$ may be made of inorganic insulating materials, such as silicon nitride (SiNx) and silicon oxide (SiOx).

A planarizing layer 160 is disposed on the protective film 180$p$. The planarizing layer 160 may be formed of at least one selected from a group of polyacrylates resins, epoxy resins, phenolic resins, polyamides resins, polyimides reins, unsaturated polyesters resins, poly-phenylenethers resins, poly-phenylenesulfides resins, and benzocyclobutene (BCB).

A protective film 180$q$ is further formed on the planarizing layer 160. The protective film 180$q$ may be made of inorganic insulating materials, such as silicon nitride (SiNx) and silicon oxide (SiOx). The protective film 180$q$ is configured to prevent the planarizing layer 160 from being loosened off and to prevent the liquid crystal layer 130 from being contaminated by organic materials infiltrating from the planarizing layer 160, thereby preventing defectives, such as image sticking caused when a screen is operated.

A contact hole 182 is formed exposing the drain electrode 171 on the protective film 180*p*, the planarizing layer 160, and the protective film 180*q*.

An electrode 191 is formed on the protective film 180*p*. The electrode 191 is connected to the drain electrode 171 through the contact hole 182. The electrode 191 receives a data voltage from the drain electrode 171.

The electrode 191 supplied with the data voltage creates an electric field with an electrode 270 of the upper display panel 40 described below, such that a direction of liquid crystal molecules 131 of the liquid crystal layer 130 between the electrodes 191 and 270 are determined accordingly. Luminance of light passing through the liquid crystal layer 130 varies according to such determined direction of the liquid crystal molecules 131.

The electrode 191 and the electrode 270 form a liquid crystal capacitor with the liquid crystal layer 130 interposed therebetween, and thus a supplied voltage is maintained even after a thin film transistor is turned off.

The electrode 191 overlaps a storage electrode line 112 along with a storage electrode 113 to form a storage capacitor. The storage capacitor may enhance a voltage-storage capacity of the liquid crystal capacitor.

An alignment layer 11 is formed on the electrode 191. The alignment layer 11 may be a vertical alignment layer or an alignment layer optically aligned using a photopolymer material.

Next, the upper display panel 40 is described below.

The electrode 270 is disposed on the substrate 120. The electrode 270 may be made of a transparent metal material, such as indium tin oxide (ITO), indium zinc oxide (IZO), and the like. A predetermined voltage may be applied to the electrode 270 and an electric field may be formed between the electrode 191 and the electrode 270.

An alignment layer 21 is formed on the electrode 270. The alignment layer 21 may be a vertical alignment layer or an alignment layer optically aligned using a photopolymer material.

Hereinafter, the second to fourth embodiments of the present invention will be described with reference to FIGS. 4 to 6.

Figure 4:
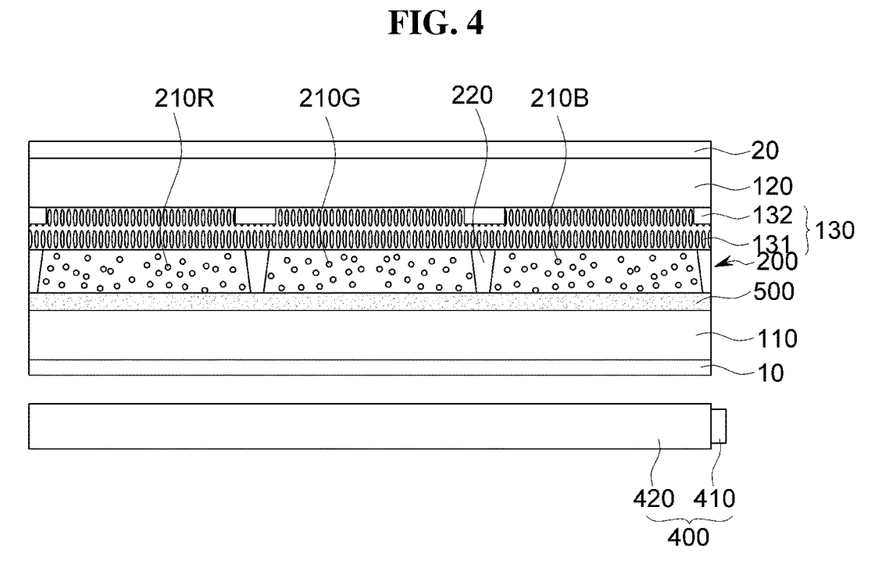
FIG. 4 is a cross-sectional view illustrating a display device according to a second embodiment of the present invention.

FIG. 4 is a cross-sectional view illustrating a display device according to a second embodiment of the present invention. FIG. 5 is a cross-sectional view illustrating a display device according to a third embodiment of the present invention. FIG. 6 is a cross-sectional view illustrating a display device according to a fourth embodiment of the present invention.

Referring to FIG. 4, the color conversion layers 200 and the wavelength conversion layer 500 are disposed on the substrate 110. The color conversion layers 200 and the wavelength conversion layer 500 may be disposed between the light-amount adjusting layer 130 and the substrate 110.

Figure 5:
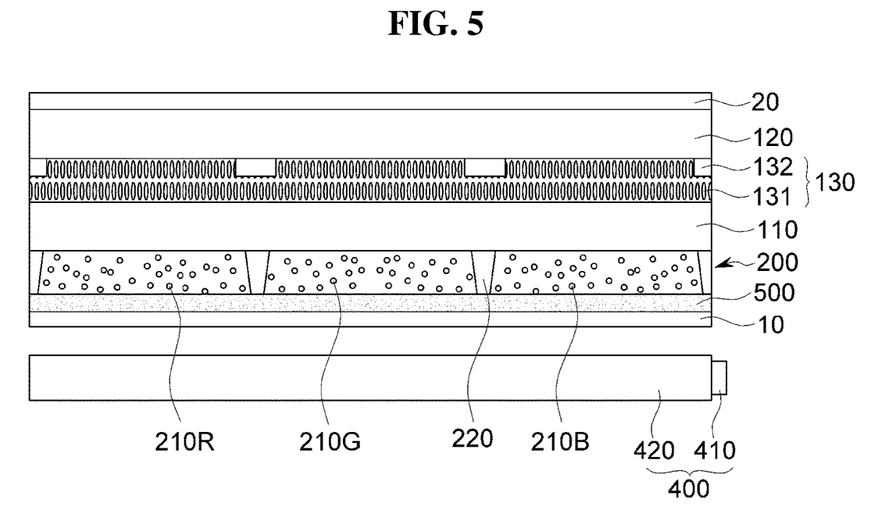
FIG. 5 is a cross-sectional view illustrating a display device according to a third embodiment of the present invention.

Referring to FIG. 5, the color conversion layers 200 and the wavelength conversion layer 500 may be disposed on a bottom surface of the substrate 110. The color conversion layers 200 and the wavelength conversion layer 500 may be disposed between the substrate 110 and the polarizer 10.

Figure 6:
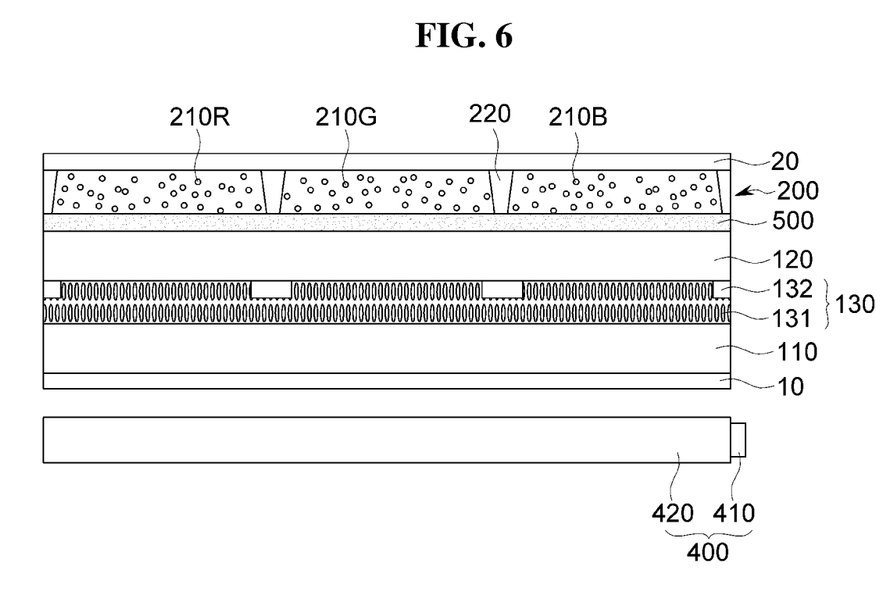
FIG. 6 is a cross-sectional view illustrating a display device according to a fourth embodiment of the present invention.

Referring to FIG. 6, the color conversion layers 200 and the wavelength conversion layer 500 may be disposed on a top surface of the substrate 120. The color conversion layers 200 and the wavelength conversion layer 500 may be disposed between the substrate 120 and the polarizer 20.

The second to fourth embodiments of the present invention are different from the first embodiment of the present invention in that the color conversion layers 200 and the wavelength conversion layer 500 are disposed in a different position. Although the color conversion layers 200 and the wavelength conversion layer 500 are disposed in a different position, the wavelength conversion layer 500 prevents color mixing as in the first embodiment of the present invention.

Hereinafter, a display device according to a fifth embodiment of the present invention will be described with reference to FIGS. 7 to 10C.

Figure 7:
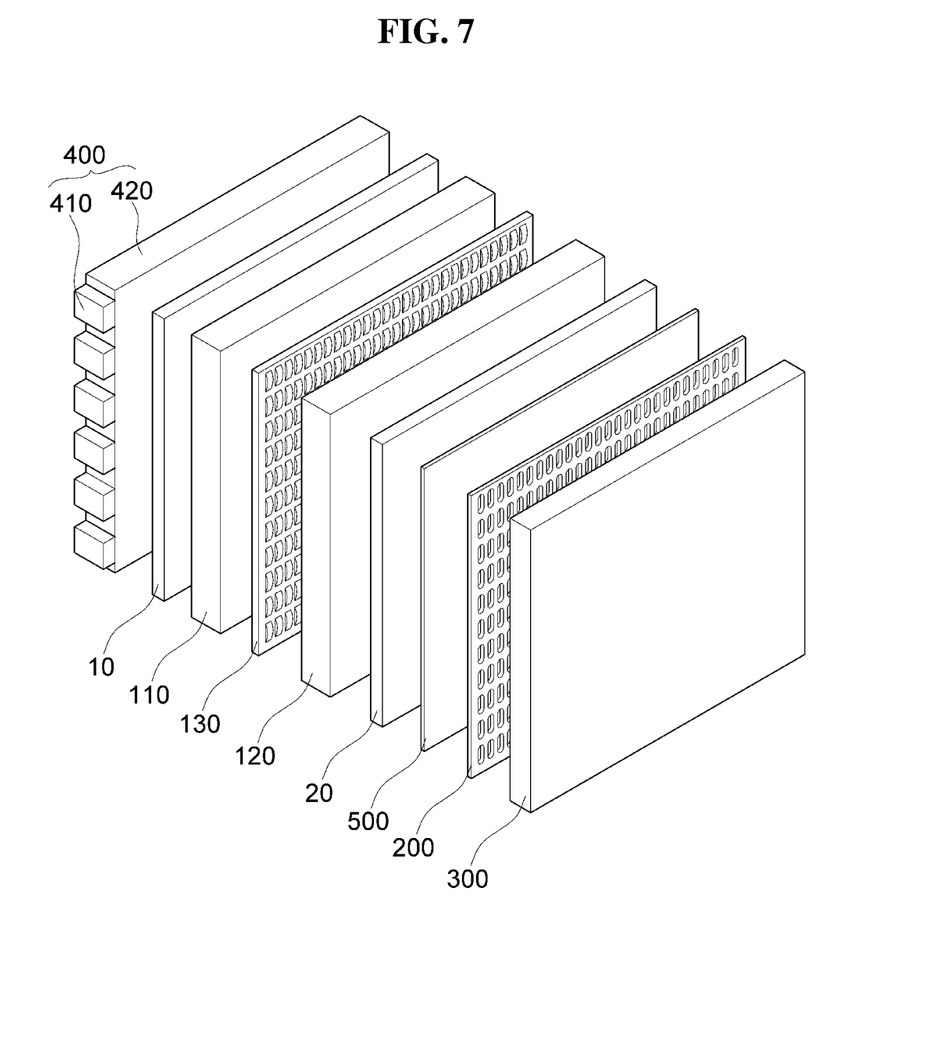
FIG. 7 is an exploded perspective view illustrating a display device according to a fifth embodiment of the present invention.
Figure 8:
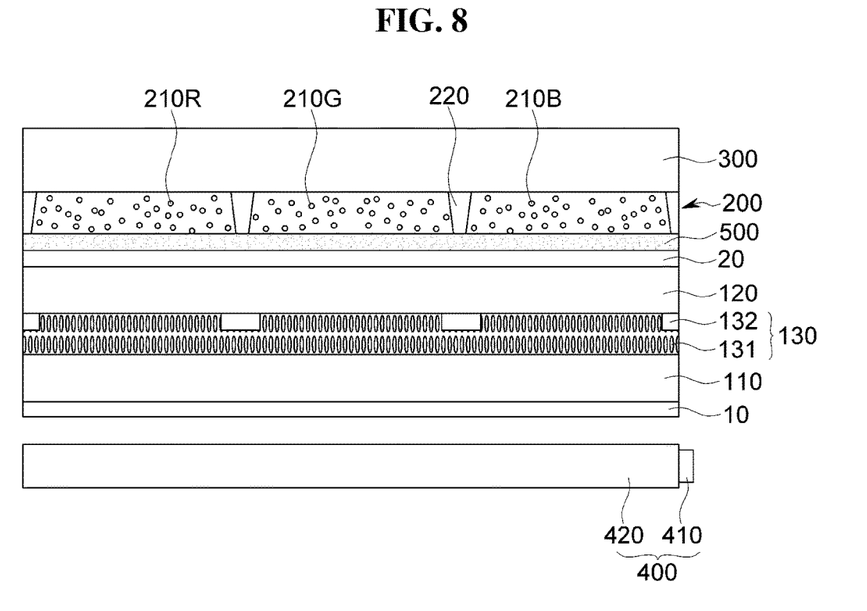
FIG. 8 is a schematic cross-sectional view illustrating the display device of FIG. 7.
Figure 9:
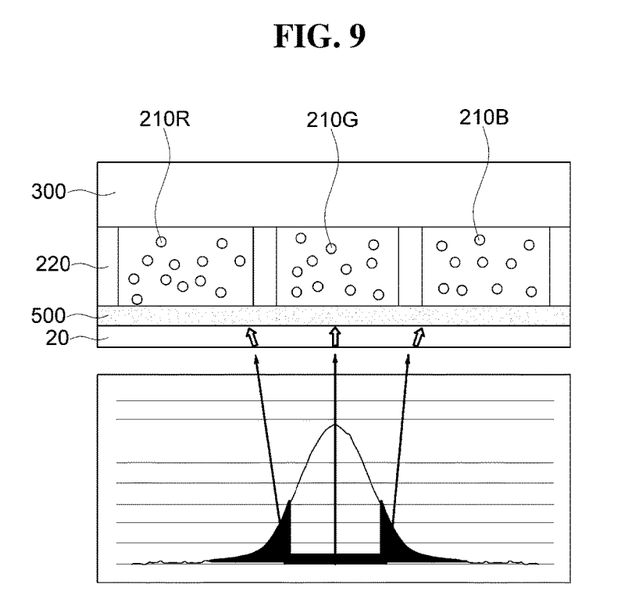
FIG. 9 is a cross-sectional view illustrating an effect of a wavelength conversion layer configured to prevent color mixing.
Figure 10A:
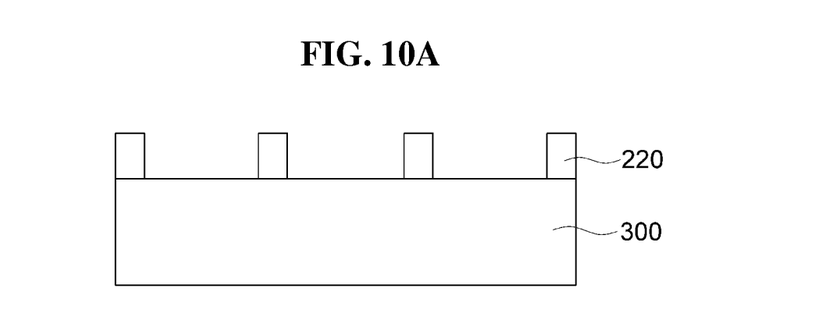
FIGS. 10A to 10C are cross-sectional views illustrating a method of manufacturing a wavelength conversion layer of FIG. 7.
Figure 10B:
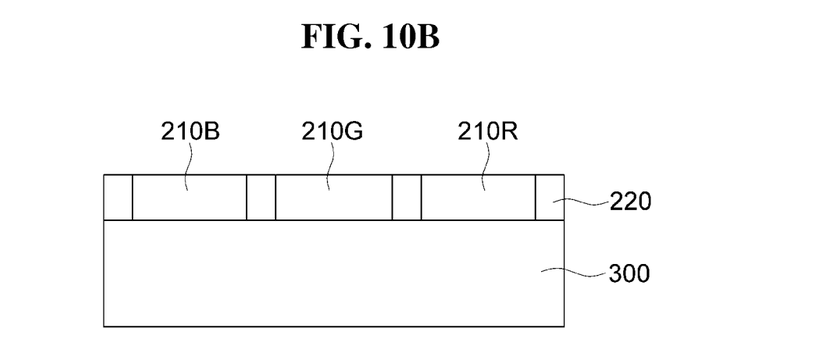
Figure 10C:
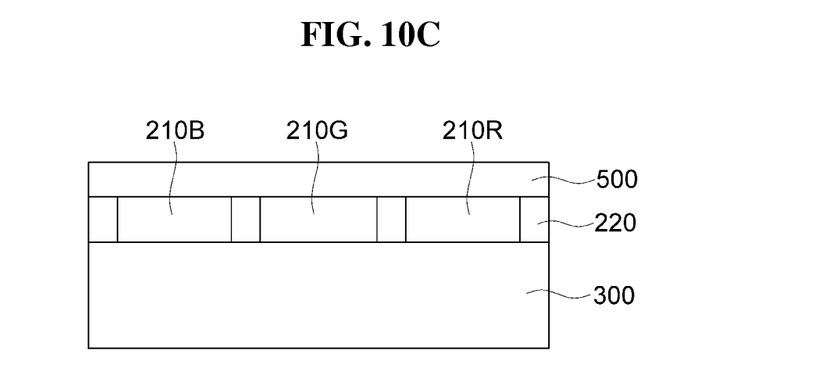

FIG. 7 is an exploded perspective view illustrating a display device according to a fifth embodiment of the present invention. FIG. 8 is a schematic cross-sectional view illustrating the display device of FIG. 7. FIG. 9 is a cross-sectional view illustrating an effect of a wavelength conversion layer configured to prevent color mixing. FIGS. 10A to 10C are cross-sectional views illustrating a method of manufacturing the wavelength conversion layer of FIG. 7.

Referring to FIGS. 7 and 8, the display device further includes a substrate 300.

The substrate 300 is made of a transparent material, such as glasses or plastics. The substrate 300 may be protective glass. A plurality of color conversion layers 200 and a wavelength conversion layer 500 are disposed between a substrate 120 and the substrate 300. The color conversion layers 200 and the wavelength conversion layer 500 are separately manufactured on the substrate 300 and attached on the substrate 120.

Meanwhile, an effect of the present invention will be described in detail with reference to FIG. 9. In FIG. 9, a pixel that is turned on to express a color is a green pixel disposed at a center portion and including the green phosphor 210G. Red and blue pixels are adjacent pixels. An area of a graph of FIG. 9 represents an amount of light. Light incident on the green pixel is 90% of a whole amount of light and light incident on the adjacent pixels is 10% of the whole amount of light.

As illustrated in FIG. 9, light incident on the adjacent pixels has a predetermined inclined angle, and thus a light path length of light passing through the wavelength conversion layer 500 becomes longer compared to light incident on the green pixels. Therefore, as illustrated in the fifth embodiment of the present invention, the wavelength conversion layer 500 may convert whole light incident on the adjacent pixels into infrared rays, although a distance between the wavelength conversion layer 500 and the light-amount adjusting layer 130 or the light source is increased.

A method of manufacturing the display device according to the fifth embodiment of the present invention will be described with reference to FIGS. 10A to 10C.

Referring to FIGS. 10A to 10C, a partition wall 220 is formed on the substrate 300. The partition wall 220 is made of a metal material, such as silver or aluminum and/or a ceramic material having excellent reflectivity. The partition wall 220 is formed by patterning the substrate 300 by a photo-lithography process and the like. The phosphors are disposed in areas defined by the partition wall 220. The red, green, and blue phosphors 210R, 210G, and 210B are respectively disposed corresponding to the pixels of the display panel. The wavelength conversion layer 500 is disposed on the partition wall 220 and the phosphor. Resins including quantum dot particles may be coated on the partition wall 220 and the phosphor to form the wavelength conversion layer 500.

Hereinafter, the display device according to a sixth embodiment of the present invention will be described with reference to FIG. 11.

Figure 11:
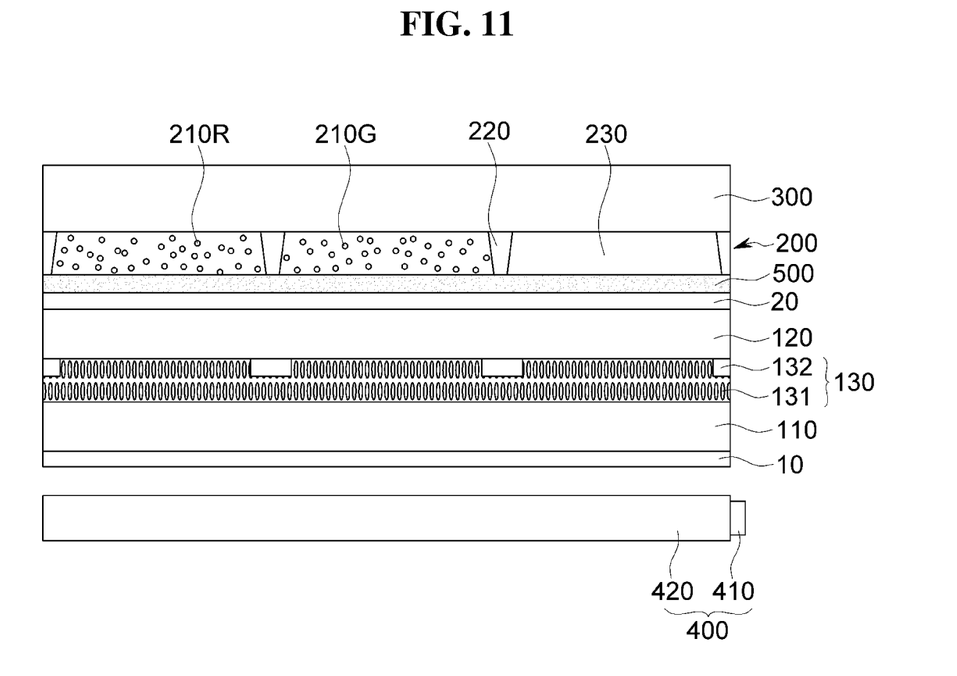
FIG. 11 is a cross-sectional view illustrating a display device according to a sixth embodiment of the present invention.

FIG. 11 is a cross-sectional view illustrating a display device according to a sixth embodiment of the present invention.

Referring to FIG. 11, a transparent layer 230 of a color conversion layers 200 may be a transparent transmissive layer made of transparent resins that does not have any color. In some embodiments, the transparent layer 230 may be omitted.

The transparent layer 230 corresponds to the blue pixel of the color conversion layers 200 and blue light may penetrate through the substrate 110 and the light-amount adjusting layer 130 without loss, thereby improving luminance of the blue light. Further, in a case where the transparent layer 230 is omitted, an additional manufacturing process for forming a blue pixel is not required, and thus it is advantageous in that the manufacturing process is simplified and the manufacturing cost is reduced.

Hereinafter, a display device according to a seventh embodiment of the present invention will be described with reference to FIGS. 12 to 14. Meanwhile, the display device according to the seventh embodiment of the present invention includes the substrate 300 of the fifth embodiment of the present invention.

Figure 12:
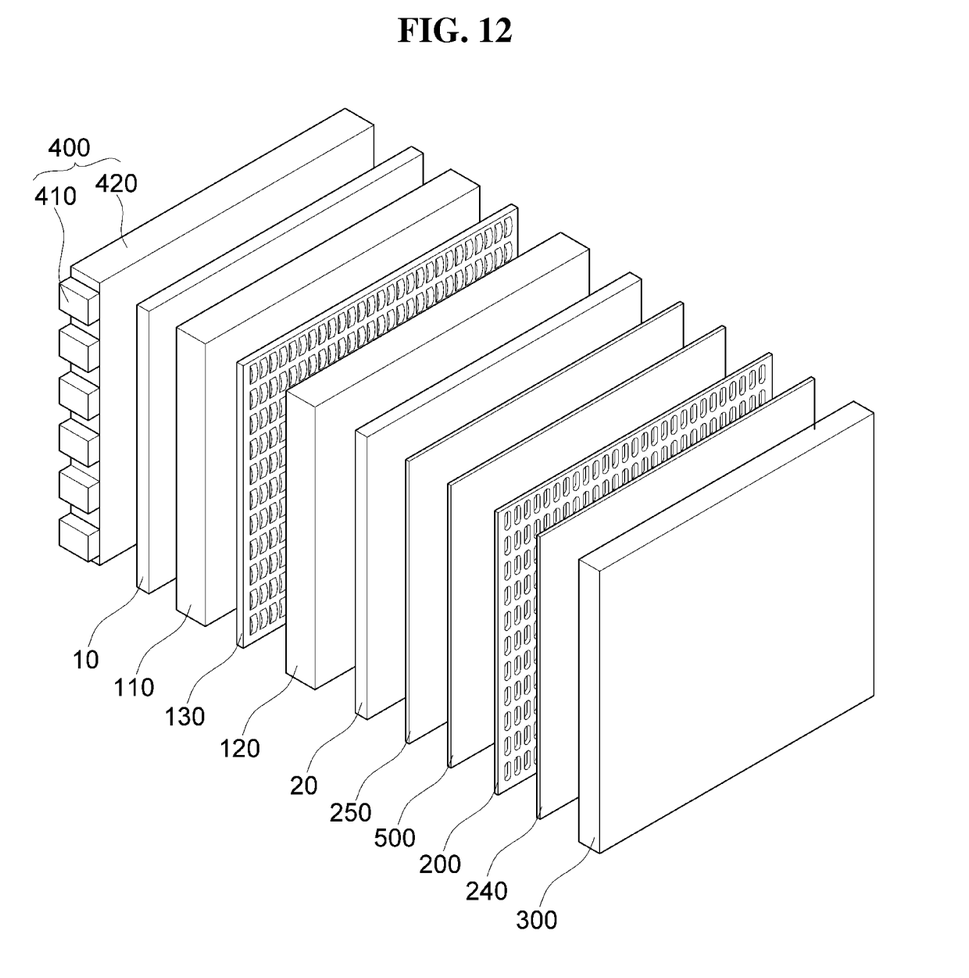
FIG. 12 is an exploded perspective view illustrating a display device according to a seventh embodiment of the present invention.

FIG. 12 is an exploded perspective view illustrating a display device according to a seventh embodiment of the present invention. FIG. 13 is a cross-sectional view illustrating the display device of FIG. 12. FIG. 14 is a cross-sectional view illustrating an effect of a blue transmissive layer and a blue blocking layer.

Figure 13:
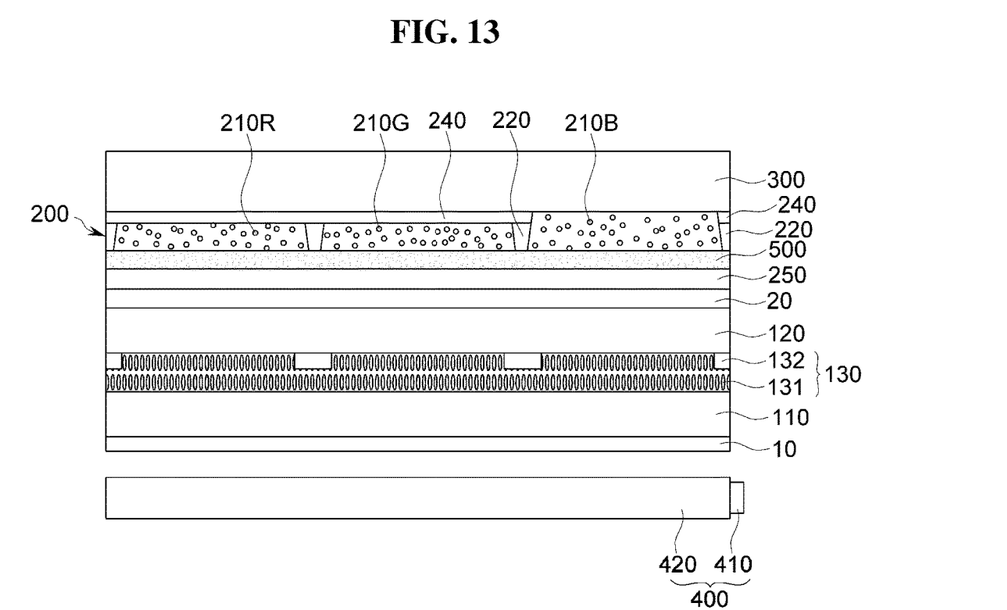
FIG. 13 is a cross-sectional view illustrating the display device of FIG. 12.
Figure 14:
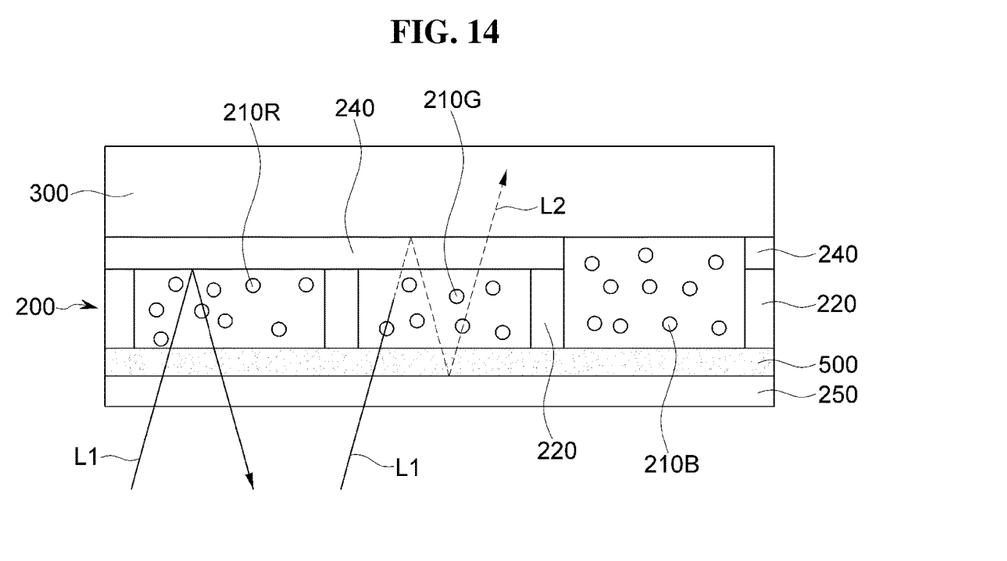
FIG. 14 is a cross-sectional view illustrating an effect of a blue transmissive layer and a blue blocking layer.

Referring to FIGS. 12 to 14, the display device further includes a blue blocking layer and a blue transmissive layer 250.

The blue blocking layer 240 is disposed on the red phosphor 210R and the green phosphor 210G. The blue blocking layer 240 has an opening only on a pixel region displaying a blue color and formed on a pixel region displaying red and green colors. The blue blocking layer 240 may be formed in a structure where at least two layers having different refractive-indexes are alternately laminated and is configured to allow light having a wavelength except a wavelength band of a blue color to pass through and block light having a wavelength band of a blue color.

As illustrated in FIG. 14, blocked blue light L1 is reflected, such that light may be recycled. The blue blocking layer 240 is configured to prevent light emitted from a blue light source from being directly emitted to the outside. That is why the blue blocking layer 240 is not formed on the pixel region for displaying a blue color and only formed on the pixel regions displaying red and green colors.

Meanwhile, the blue light L1 is used as the light source according to an embodiment of the present invention, and thus the blue blocking layer 240 has an opening only on the pixel region for displaying a blue color. However, in some embodiments, red or green light sources may be used and, in this case, the blue blocking layer 240 may have an opening on a pixel region for displaying a corresponding color.

The blue transmissive layer 250 is disposed under the wavelength conversion layer 500. The blue transmissive layer 250 is formed of a dichroic filter.

The dichroic filter is configured to reflect secondary light L2 having a wavelength different from incident primary light L1 and selectively allow light having the same wavelength as the primary light L1 to pass through. The primary light L1 is the blue light L1 emitted from the light source and the second light L2 that has a wavelength different from the primary light L1 is the red or green light of which wavelength is converted by the color conversion layers 200.

Accordingly, light radiated toward a rear side of the display panel of the secondary light L2 radiated from the color conversion layers 200 is reflected off the blue transmissive layer 250 and emitted toward a front side of the display panel.

The blue transmissive layer 250 has a multi-layer structure where a thin film made of a material having a high refractive index and a thin film made of a material having a low refractive index are alternately laminated. A selective light transmissive function of the blue transmissive layer 250 may be achieved by high reflectivity imparted by a multilayer film interference phenomenon. A material having a low refractive index includes metal or metal oxides, such as $MgF_2$ and $SiO_2$, and a material having a high refractive index includes metal or metal oxides, such as Ag, $TiO_2$, $Ti_2O_3$, and $Ta_2O_3$. However, embodiments of the present invention are not limited thereto. Further, the thicknesses of the respective thin films may be determined in a range of ⅛ to ½ of a wavelength of light passing through the thin films.

In a case where the blue transmissive layer 250 has a structure where a plurality of different dielectric thin films having different refractive indexes from each other are laminated, the multilayer film interference phenomenon occurs in the blue transmissive layer 250, which is caused by a mirror surface having much higher reflectivity compared to the metal. The blue transmissive layer 250 is called an edge filter in an optics field. Further, in some embodiments, the blue transmissive layer 250 may be designed to have sudden reflectivity changes with respect to a predetermined wavelength.

The blue transmissive layer 250 may selectively pass/reflect light having a predetermined wavelength according to a structure of the dielectric thin film, thereby improving a light efficiency. For example, in a case where the primary light L1 incident on the color conversion layers 200 is blue light, the blue transmissive layer 250 may be designed to allow the blue light to pass through and to reflect the green and red light. Therefore, the secondary light L2 radiated toward a rear side of the display panel among green and red light radiated from the color conversion layers 200 may be reflected by the blue transmissive layer 250 and emitted toward a front side of the display panel. Accordingly, the blue transmissive layer 250 may improve light efficiency.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display device comprising:
a first substrate;
a second substrate above and facing the first substrate;
a light-amount adjusting layer interposed between the first substrate and the second substrate;
a plurality of color conversion layers respectively defining a plurality of pixel regions;
a wavelength conversion layer disposed on a bottom surface of the color conversion layers; and
a backlight unit disposed under the first substrate, the wavelength conversion layer converting a part of visible light emitted from the backlight unit into invisible light.

2. The display device of claim 1, the color conversion layers and the wavelength conversion layer being disposed on a bottom surface of the second substrate, wherein the light-amount adjusting layer comprises liquid crystal molecules.

3. The display device of claim 1, the color conversion layers and the wavelength conversion layer being disposed on a top surface of the second substrate, wherein the light-amount adjusting layer comprises liquid crystal molecules.

4. The display device of claim 3, further comprising a third substrate above and facing the second substrate.

5. The display device of claim 4, the wavelength conversion layer and the color conversion layers being disposed between the second substrate and the third substrate.

6. The display device of claim 1, the wavelength conversion layer converting a part of light emitted from the backlight unit into infrared rays.

7. The display device of claim 1, the wavelength conversion layer having a thickness in a range of 1 μm to 10 μm.

8. The display device of claim 1, the wavelength conversion layer comprising a phosphor.

9. The display device of claim 8, the phosphor comprising a quantum dot particle.

10. The display device of claim 1, the color conversion layers comprising:
a partition wall defining pixel areas; and
color phosphor disposed in the pixel areas defined by the partition wall.

11. The display device of claim 10, the color phosphor in each pixel area comprising at least one of a red phosphor, a green phosphor, and a blue phosphor.

12. The display device of claim 11, further comprising a blue transmissive layer under the wavelength conversion layer.

13. The display device of claim 12, further comprising a blue blocking layer on the red phosphor and the green phosphor.

14. The display device of claim 1, the color conversion layers comprising:
a color phosphor; and
a transparent layer.

15. A display device comprising:
a first substrate;
a second substrate above and facing the first substrate;
a light-amount adjusting layer interposed between the first substrate and the second substrate;
a backlight unit disposed under the first substrate;
a wavelength conversion layer, the wavelength conversion layer converting a part of light emitted from the backlight unit into infrared rays; and
a plurality of color conversion layers corresponding to a plurality of pixel regions disposed between the wavelength conversion layer and the light-amount adjusting layer.

16. The display device of claim 15, the color conversion layers being disposed on a bottom surface of the first substrate.

17. The display device of claim 15, the wavelength conversion layer being disposed on an upper surface of the first substrate.

18. The display device of claim 16, further comprising a polarizer disposed under the color conversion layers, wherein the light-amount adjusting layer comprises liquid crystal molecules.

19. A display device comprising:
a first substrate;
a second substrate above and facing the first substrate;
a light-amount adjusting layer interposed between the first substrate and the second substrate;
a backlight unit disposed under the first substrate;
a wavelength conversion layer, the wavelength conversion layer converting a part of light emitted from the backlight unit into infrared rays; and
a plurality of color conversion layers corresponding to a plurality of pixel regions disposed on the wavelength conversion layer.

20. The display device of claim 19, further comprising:
the wavelength conversion layer being disposed on an upper surface of the second substrate; and
a polarizer disposed on the color conversion layers, wherein the light-amount adjusting layer comprises liquid crystal molecules.

21. The display device of claim 1, wherein the wavelength conversion layer converts more amount of the light into the infrared rays as a lightpath of the light passing through the wavelength conversion layer is increasing.

* * * * *